United States Patent
Sedor et al.

(10) Patent No.: US 10,656,360 B2
(45) Date of Patent: May 19, 2020

(54) EPOXY TRANSITIONS FOR OPTICAL FIBER MODULES

(71) Applicant: Panduit Corp., Tinley Park, IL (US)

(72) Inventors: Thomas M. Sedor, Orland Park, IL (US); Mark T. Sargis, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/245,441

(22) Filed: Jan. 11, 2019

(65) Prior Publication Data

US 2019/0265428 A1  Aug. 29, 2019

Related U.S. Application Data

(60) Provisional application No. 62/620,753, filed on Jan. 23, 2018.

(51) Int. Cl.
*G02B 6/44*    (2006.01)
*G02B 6/245*   (2006.01)
*G02B 6/38*    (2006.01)

(52) U.S. Cl.
CPC ........... *G02B 6/4471* (2013.01); *G02B 6/245* (2013.01); *G02B 6/3897* (2013.01); *G02B 6/4453* (2013.01); *G02B 6/4479* (2013.01); *G02B 6/3823* (2013.01); *G02B 6/3887* (2013.01); *G02B 6/4472* (2013.01)

(58) Field of Classification Search
CPC ... G02B 6/4239; G02B 6/4471; G02B 6/4479
See application file for complete search history.

(56) References Cited

U.S. PATENT DOCUMENTS

| | | | |
|---|---|---|---|
| 6,993,239 B2 | 1/2006 | Dela Rosa et al. | |
| 7,430,357 B2 | 9/2008 | Holt et al. | |
| 7,844,158 B2* | 11/2010 | Gronvall | G02B 6/4471 385/135 |
| 7,945,136 B2* | 5/2011 | Cooke | G02B 6/4471 385/135 |
| 8,290,333 B2* | 10/2012 | Barlowe | G02B 6/4471 385/137 |
| 8,457,461 B2* | 6/2013 | Ott | G02B 6/2558 385/103 |
| 8,917,968 B2* | 12/2014 | Cooke | G02B 6/4471 385/139 |
| 9,297,974 B2 | 3/2016 | Valderrabano Berrones et al. | |
| 2008/0138026 A1* | 6/2008 | Yow | G02B 6/4471 385/137 |

(Continued)

FOREIGN PATENT DOCUMENTS

WO    WO 2013/063045 A1    5/2013

*Primary Examiner* — Daniel Petkovsek
(74) *Attorney, Agent, or Firm* — Christopher S. Clancy; James H. Williams; Peter S. Lee

(57) ABSTRACT

Various implementations of epoxy transitions for fiber optic modules are disclosed. As disclosed herein, a fiber optic module system may include a fiber optic module holding a plurality of multi-fiber adapters at a front of the fiber optic module, a multi-fiber cable, and an epoxy transition to transition the multi-fiber cable to a plurality of individual optical fibers inside the fiber optic module. The epoxy transition may be filled with an epoxy to secure the individual optical fibers inside the epoxy transition.

10 Claims, 9 Drawing Sheets

(56) References Cited

U.S. PATENT DOCUMENTS

| | | |
|---|---|---|
| 2011/0317975 A1 | 12/2011 | Lu et al. |
| 2012/0014651 A1 | 1/2012 | Nad et al. |
| 2013/0064506 A1 | 3/2013 | Eberle, Jr. et al. |
| 2015/0268434 A1 | 9/2015 | Barnette, Jr. et al. |
| 2017/0322386 A1 | 11/2017 | Morris et al. |
| 2019/0293892 A1* | 9/2019 | Wentworth .......... G02B 6/3878 |

* cited by examiner

EPOXY TRANSITIONS FOR OPTICAL FIBER MODULES

PRIORITY

This application claims the benefit of U.S. Provisional Application No. 62/620,753, filed on Jan. 23, 2018, the contents of which are incorporated herein by reference.

BACKGROUND

An optical fiber module (also referred to as a cassette) may be used to transition individual fibers in a multi-fiber cable to fiber adapters such as LC, MTP, or SC adapters. In some implementations, a multi-fiber cable may be attached to an optical fiber module via a Multi-Fiber Push-on/Pull-off (MPO) adapter, where the individual fibers in the multi-fiber cable are terminated in an MPO connector. In other implementations, the multi-fiber cable may be attached to the optical fiber module via a transition, where the individual fibers in the multi-fiber cable are distributed internally to the module and directly attached to the fiber adapters.

SUMMARY

The present disclosure provides new and innovative epoxy transitions for optical fiber modules. An example system includes a fiber optic module holding multi-fiber adapters at the front of the fiber optic module, a multi-fiber cable, and an epoxy transition to transition the multi-fiber cable to individual optical fibers inside the fiber optic module. In the example, the epoxy transition may be filled with an epoxy to secure the individual optical fibers inside the epoxy transition.

An example method includes inserting a multi-fiber cable into a boot of an epoxy transition and stripping a portion of an outer jacket on the multi-fiber cable to expose a sheathing. Additionally, the example method includes stripping a portion of the exposed sheathing to expose individual optical fibers in the multi-fiber cable, inserting the individual optical fibers through a hole in a molded transition piece of the epoxy transition, and attaching the boot to the molded transition piece. Next, the hole may be filled with an epoxy to secure the individual optical fibers within the molded transition piece.

BRIEF DESCRIPTION OF THE DRAWINGS

The following detailed description references the drawings, wherein.

DETAILED DESCRIPTION

Figure 1:
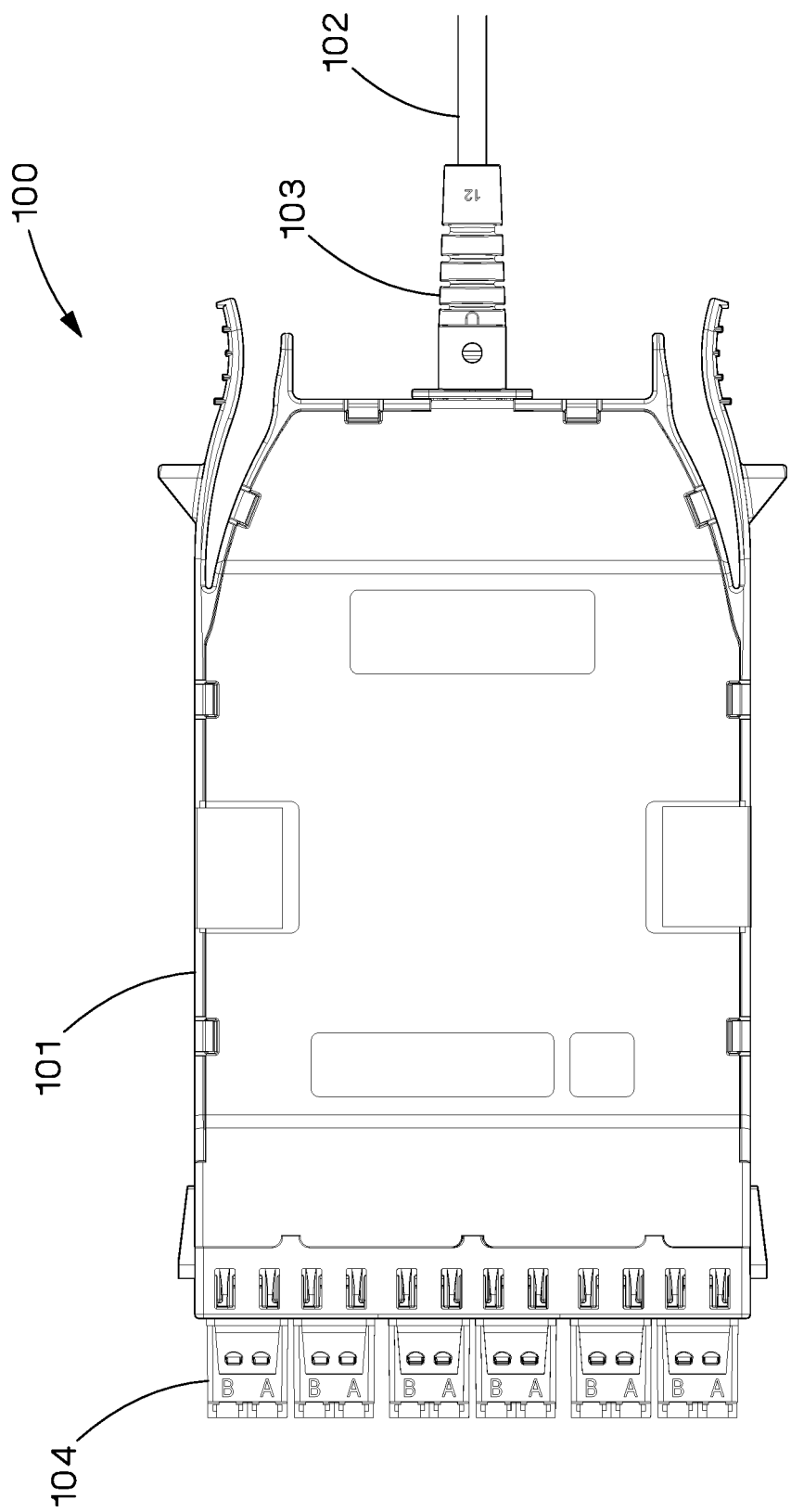
FIG. 1 is an illustration of an example fiber optic module system.

Tethered fiber optic modules may be used for a permanent low loss solution in place of connectorized fiber optic modules. Tethered fiber optic modules remove the rear MPO connection of connectorized fiber optic modules, which can reduce the loss of the permanent link. Tethered fiber optic modules also provide a lower cost option compared to connectorized fiber optic modules.

During environmental conditioning, the outer jacket of the cable of a tethered fiber optic module may shrink. If the individual optical fibers of the multi-fiber cable are not constrained at the module entry point during such conditions, the fibers will move into and become congested inside of the fiber optic module. As a result, the individual optical fibers may bend abruptly, thereby inducing signal loss.

Examples disclosed herein describe various implementations of epoxy-based transitions for tethered fiber optic modules. The disclosed epoxy transitions can securely fasten a multi-fiber cable at the rear of the fiber optic module for improved fiber retention within the fiber optic module and cable assembly. Moreover, the disclosed epoxy transitions can eliminate pistoning of individual optical fibers within a fiber optic module. In addition, the disclosed epoxy transitions isolate the individual optical fibers inside of the multi-fiber cable, thereby preventing the fibers from becoming congested inside of the fiber optic module.

Reference will now be made to the accompanying drawings. Wherever possible, the same reference numbers are used in the drawings and the following description to refer to the same or similar parts. It is to be expressly understood, however, that the drawings are for illustration and description purposes only. While several examples are described in this document, modifications, adaptations, and other implementations are possible. Accordingly, the following detailed description does not limit the disclosed examples. Instead, the proper scope of the disclosed examples may be defined by the appended claims.

FIG. 1 illustrates a top-down view of an example fiber optic module system 100. As shown in FIG. 1, fiber optic module system 100 may include a fiber optic module 101 attached to a multi-fiber cable 102 by an epoxy transition 103. Fiber optic module 101 may hold a plurality of fiber optic adapters 104, which can be single or multiple (e.g., duplex) LC adapters, MTP adapters, SC adapters, etc. In some implementations, fiber optic adapters 104 may be inserted into a front face of fiber optic module 101 and multi-fiber cable 102 may be inserted into a rear face of fiber optic module 101 through epoxy transition 103.

Figure 2:
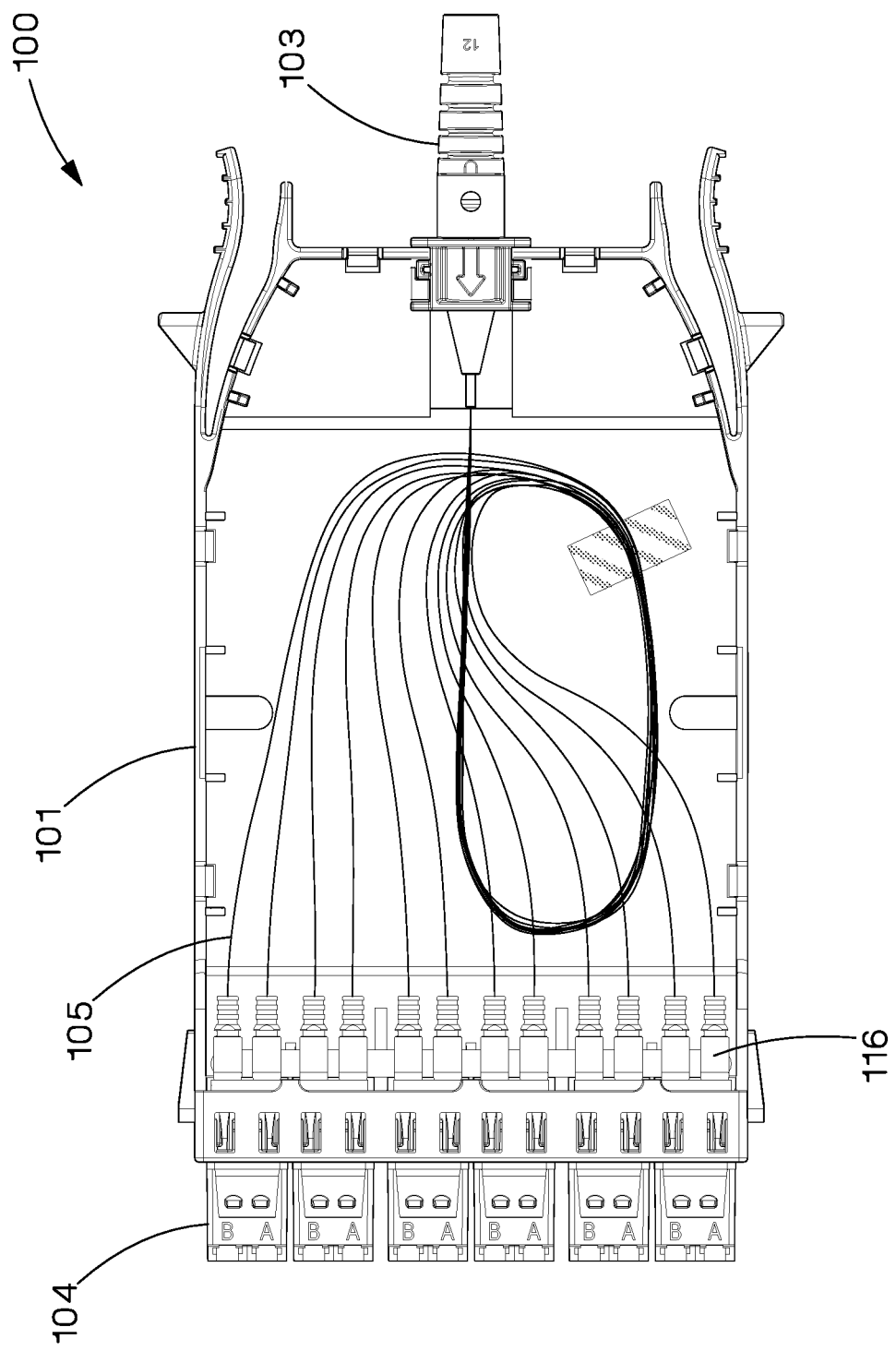
FIG. 2 is another illustration of the example fiber optic module system shown in FIG. 1.

FIG. 2 illustrates another top-down view of fiber optic module system 100 with its top cover removed and illustrating the internal arrangement therein. As shown in FIG. 2, multi-fiber cable 102 is transitioned to individual optical fibers 105 inside fiber optic module 101 via epoxy transition 103. Optical fibers 105 may be terminated in single fiber optic connectors 116. Fiber optic connectors 116 may be inserted into fiber optic adapters 104.

Figure 3:
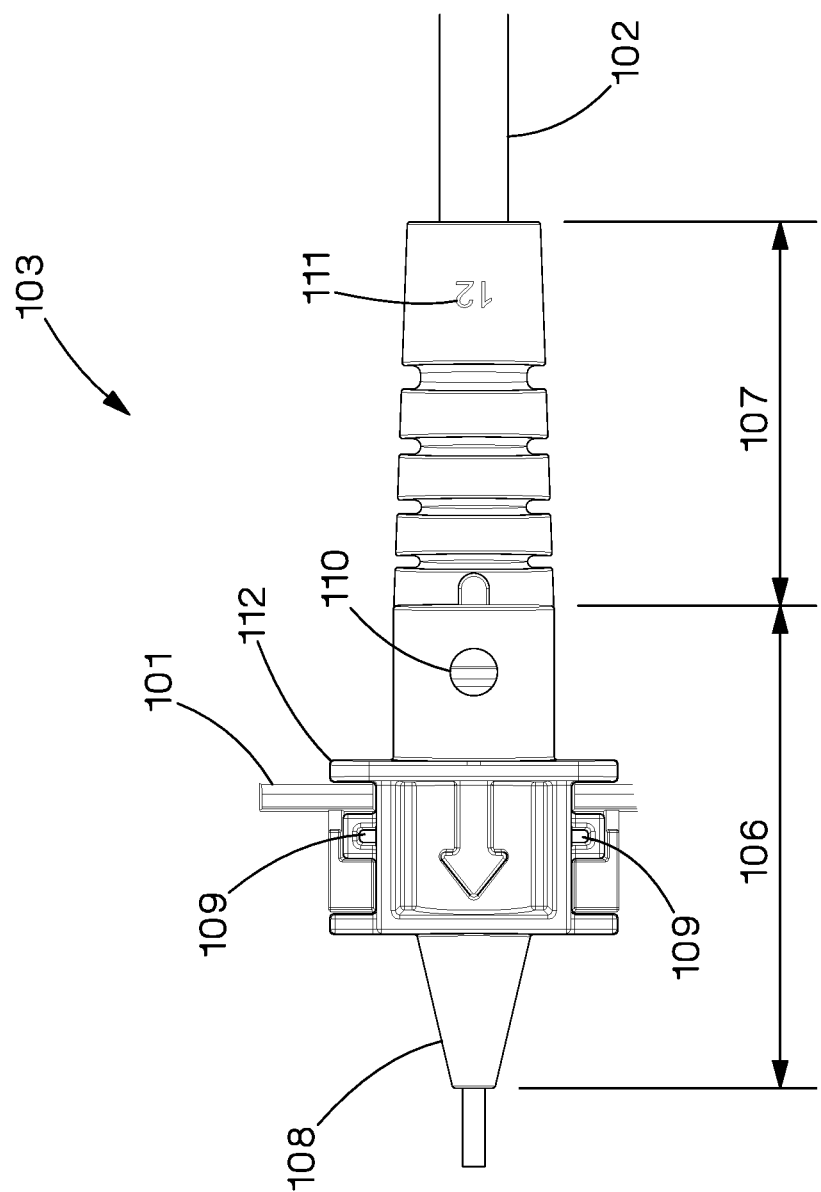
FIG. 3 is an illustration of an example epoxy transition.
Figure 4:
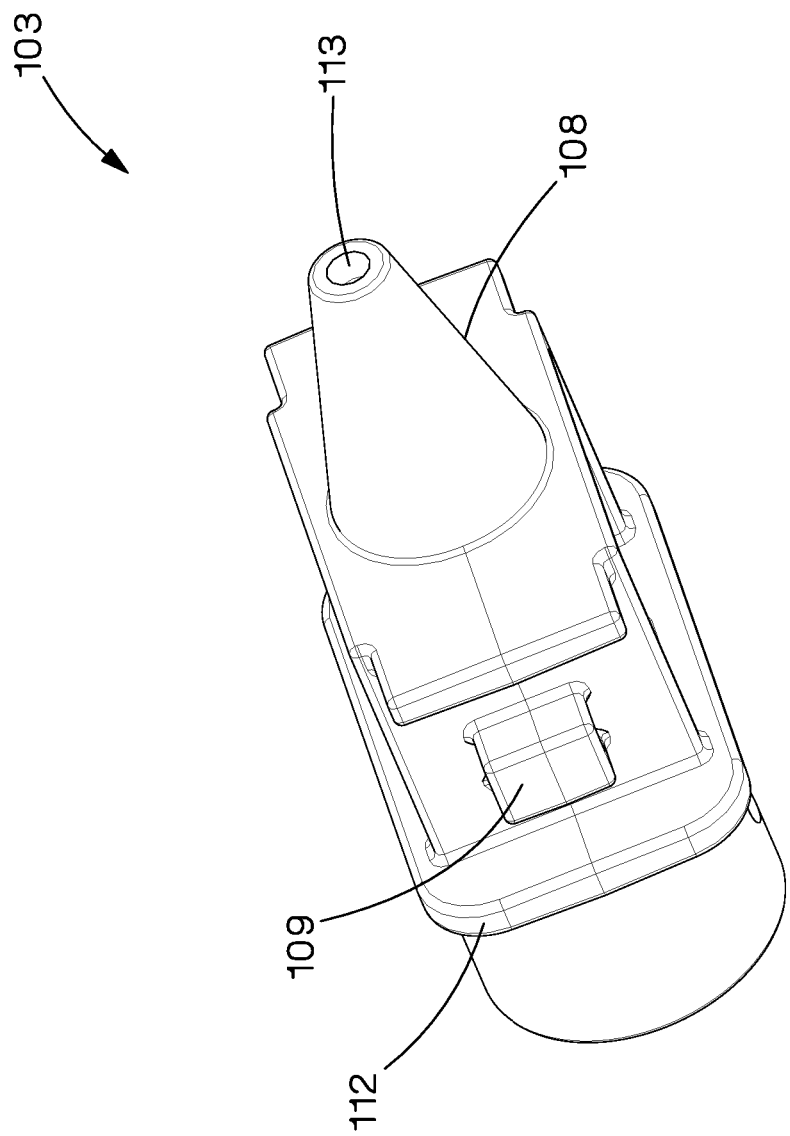
FIG. 4 is another illustration of the example epoxy transition shown in FIG. 3.
Figure 5:
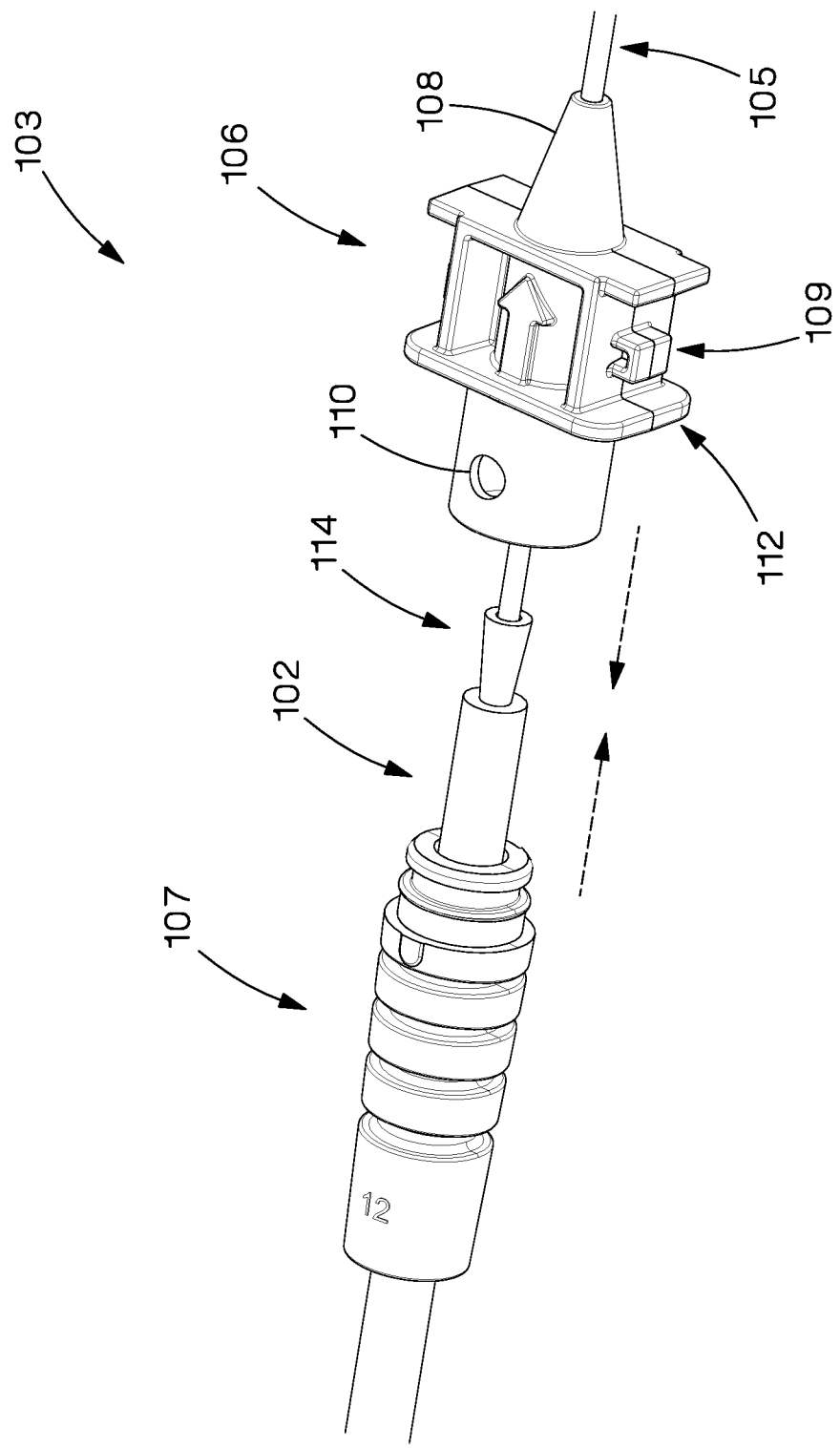
FIG. 5 is another illustration of the example epoxy transition shown in FIG. 3.
Figure 6:
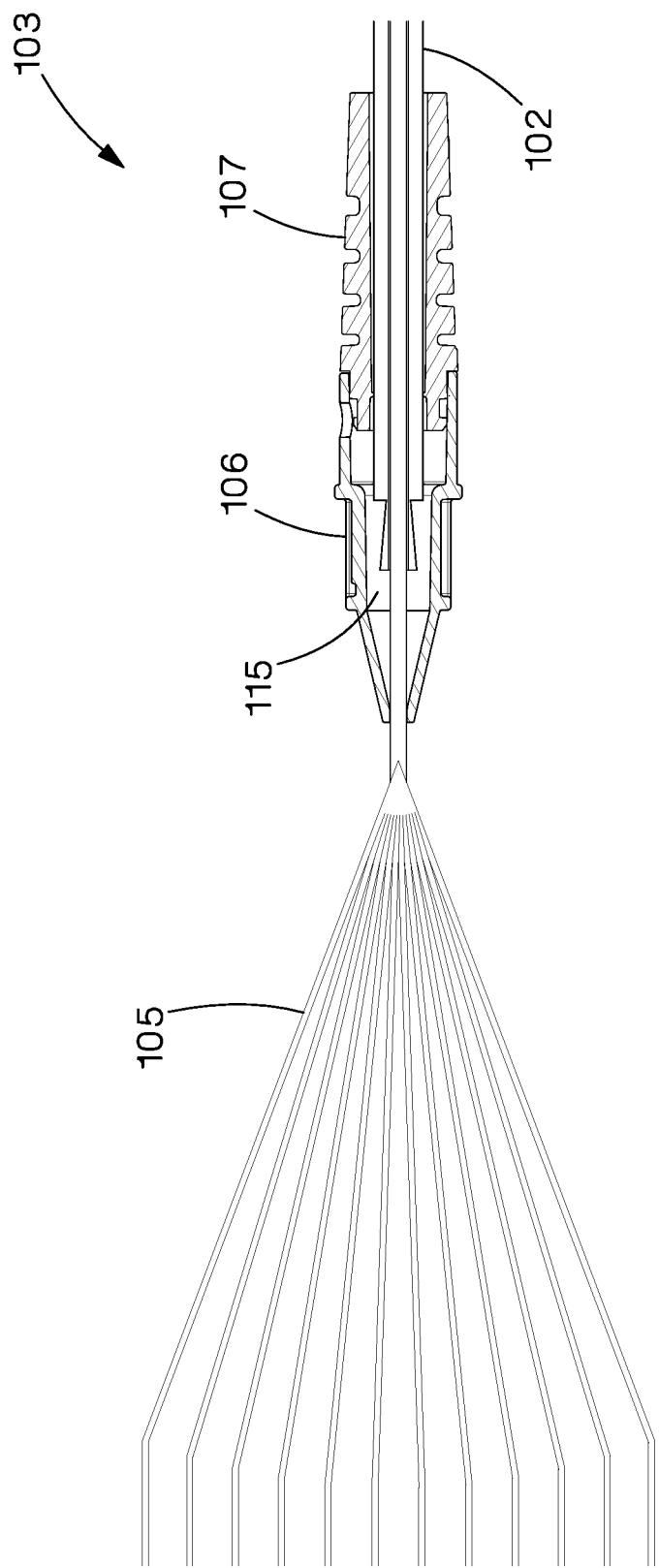
FIG. 6 is another illustration of the example epoxy transition shown in FIG. 3.

FIGS. 3-6. illustrate an exemplary epoxy transition 103 in detail, with FIG. 3 being a top-down view, FIG. 4 being a front perspective view, FIG. 5 being an exploded front perspective view, and FIG. 6 being a cross-sectional side view. Epoxy transition 103 may include a molded transition piece 106 and boot 107. To install multi-fiber cable 102 in epoxy transition 103, multi-fiber cable 102 may be inserted through boot 107. A cable size identifier 111 on boot 107 may denote the fiber count that boot 107 is designed to be used with. For example, in FIG. 3 the identifier 111 is "12", indicating the boot in the example may be designed to be used with a fiber count of 12. In alternate embodiments, the fiber count may be more or less than 12 (e.g., 24). A portion (e.g., 13.5") of the outer jacket on the part of multi-fiber cable 102 that has been inserted through boot 107 may be stripped to expose individual optical fibers 105 wrapped in a sheathing 114 such as a Kevlar wrap. Optionally, the bundle may additionally be an Acrylate Coated Bundle. Sheathing 114 may be stripped back such that a portion (e.g., 1.4" from the outer jacket) of sheathing 114 remains exposed.

Stripped individual optical fibers 105 may be inserted through hole 113 in molded transition piece 106. As shown in FIG. 5, molded transition piece 106 and boot 107 are then pressed toward each other such that a portion of boot 107 fits tightly inside of molded transition piece 106. Molded transition piece 106 is then filled with an epoxy 115 through fill hole 110 on the top of molded transition piece 106. As it enters the cavity inside molded transition piece 106, epoxy 115 presses any air within molded transition piece 106 through cone 108 and out of hole 113, thus improving the hold of individual optical fibers 105 in molded transition piece 106. The limitation of movement of the optical fibers in the cassette due to the epoxy 115 aids to reduce the amount of optical loss seen in the assembly. In some implementations, the cavity in molded transition piece 106 may be filled with epoxy 115 such that a small portion of epoxy 115 escapes through hole 113, thus providing a visual indicator to the installer that the cavity has been completely filled with epoxy 115. Epoxy 115 prevents multi-fiber cable 102 from backing out of epoxy transition 103. Boot 107 also provides bend radius control of multi-fiber cable 102.

Single fiber optic connectors 116 may be terminated onto individual optical fibers 105 and assembled epoxy transition 103 may be attached to fiber optic module 101. Molded transition piece 106 of epoxy transition 103 may include a pair of tabs 109 and a flange 112 for mounting into a slot in the back of fiber optic module 101. The walls of optical fiber module 101 may slide snugly in between tabs 109 and flange 112 to secure epoxy transition 103 to fiber optic module 101. Once epoxy transition 103 has been installed, individual optical fibers 105 may be routed inside fiber optic module 101 in a circular fashion (as shown in FIG. 2) to maintain a minimum acceptable bend radius. Single fiber optic connectors 116 may be inserted into fiber optic adapters 104 at the front of fiber optic module 101.

Figure 7:
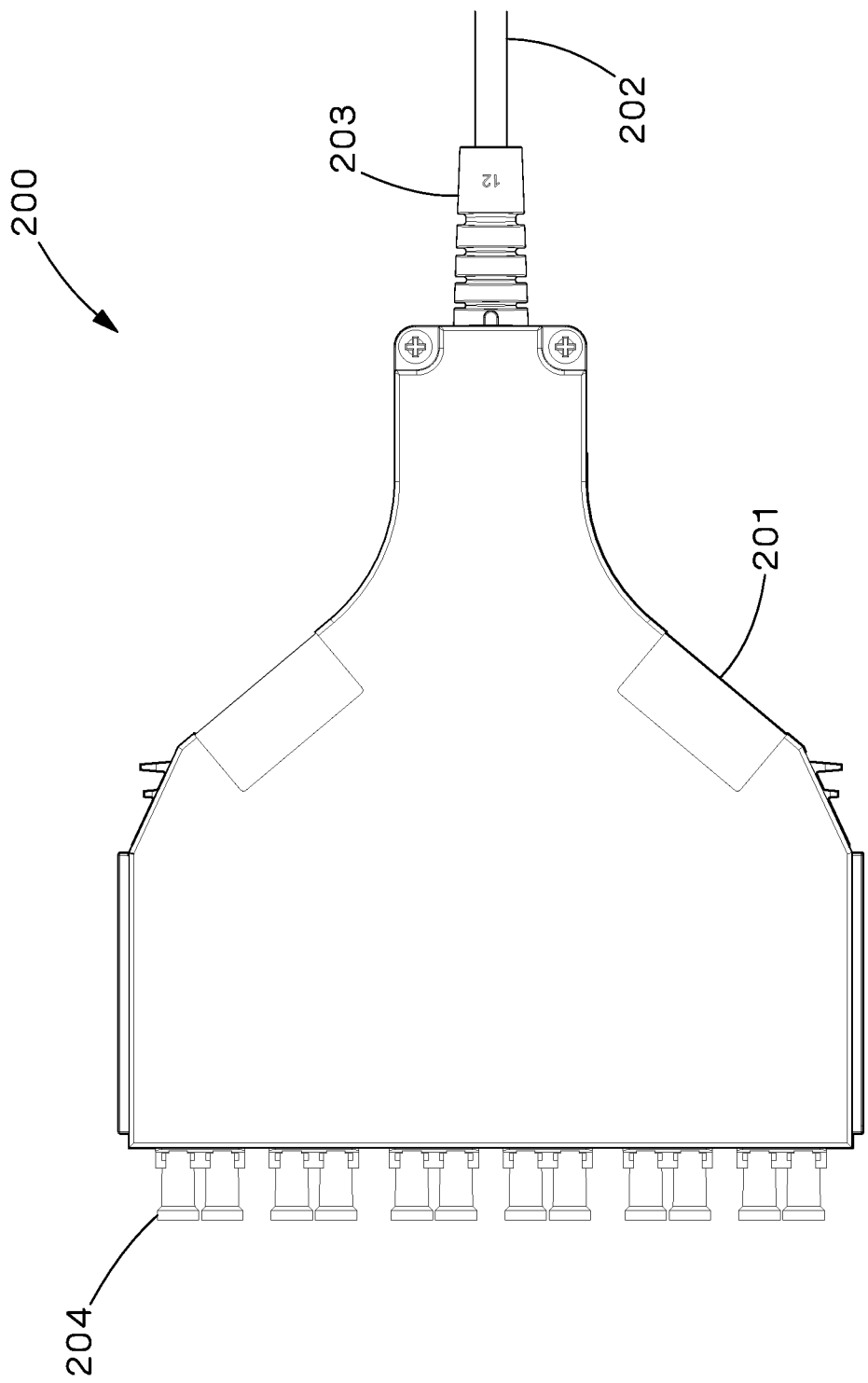
FIG. 7 is an illustration of another example fiber optic module system.
Figure 8:
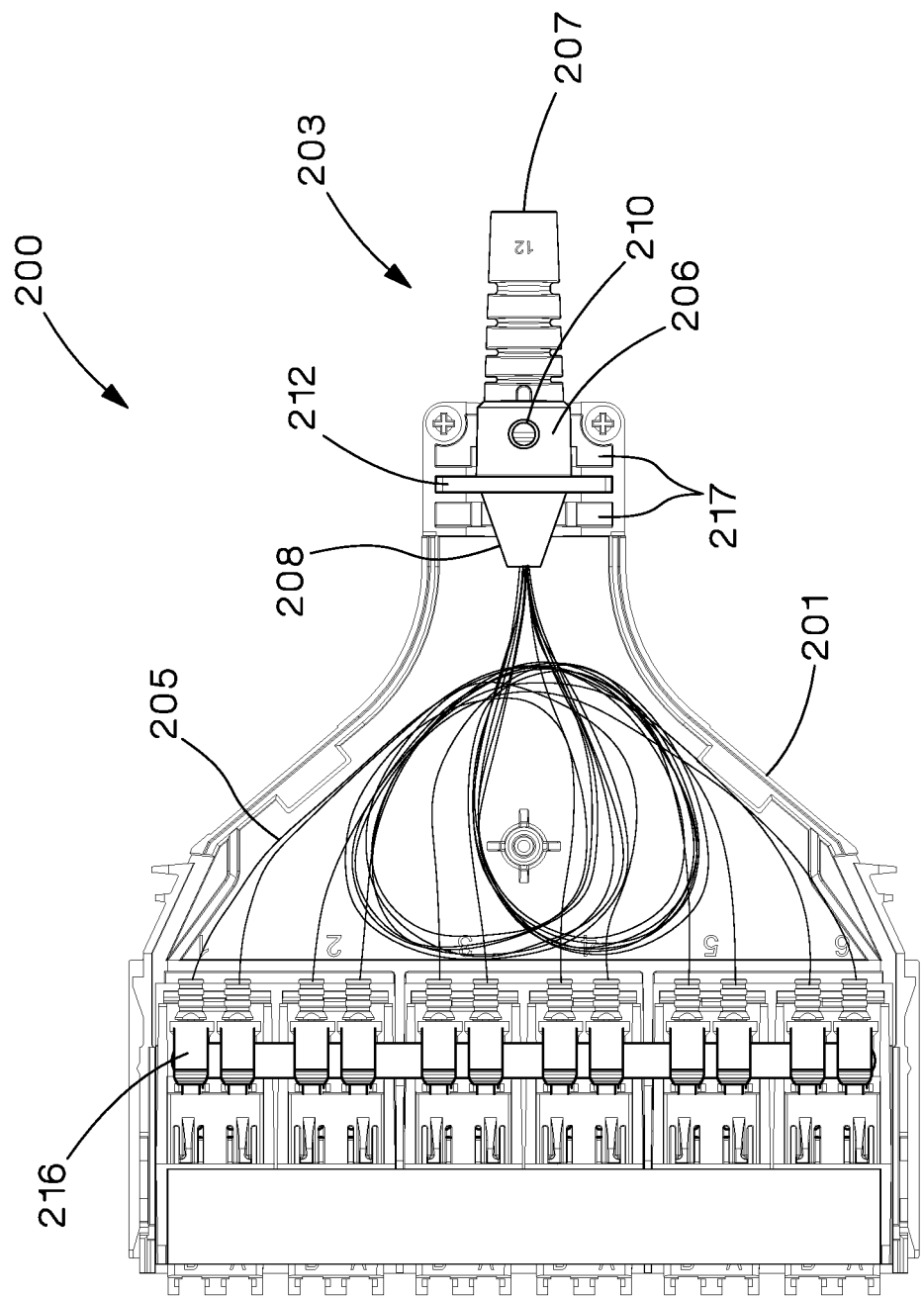
FIG. 8 is another illustration of the example fiber optic module system shown in FIG. 7.
Figure 9:
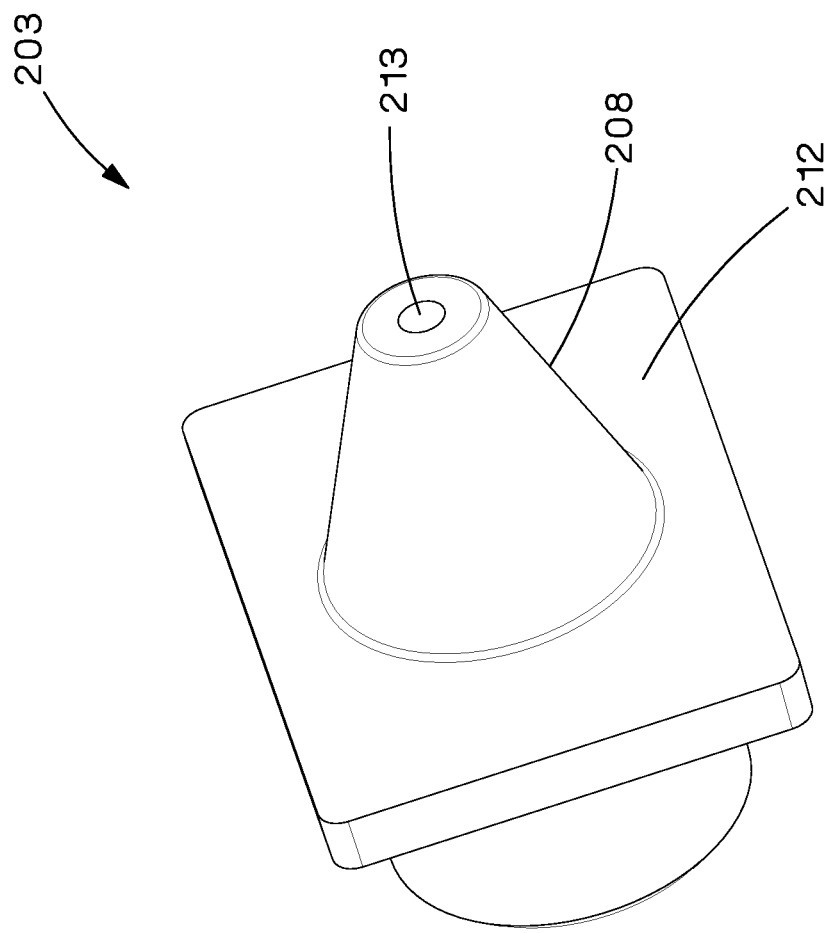
FIG. 9 is an illustration of another example epoxy transition.

FIGS. 7-9 illustrate another example implementation of a fiber optic module system 200 having a fiber optic module 201 and an epoxy transition 203. Fiber optic module 201 may have a different form-factor compared to fiber optic module 101, and thus the mounting solution for mounting epoxy transition 203 to fiber optic module 201 is slightly different. However, assembly of epoxy transition 203 may be similar to epoxy transition 103 described above.

To install multi-fiber cable 202 in epoxy transition 203, multi-fiber cable 202 may be inserted through boot 207. A portion (e.g., 13.5") of the outer jacket on the part of multi-fiber cable 202 that has been inserted through boot 207 may be stripped to expose individual optical fibers 205 wrapped in a sheathing (not shown) such as a Kevlar wrap. The sheathing may be stripped back such that a portion (e.g., 1.4" from the outer jacket) of the sheathing remains exposed.

Stripped individual optical fibers 205 may be inserted through hole 213 in molded transition piece 206. Molded transition piece 206 and boot 207 are then pressed toward each other such that a portion of boot 207 fits tightly inside of molded transition piece 206. Molded transition piece 206 is then filled with an epoxy through fill hole 210 on the top of molded transition piece 206. As it enters the cavity inside molded transition piece 206, the epoxy presses any air within molded transition piece 206 through cone 208 and out of hole 213, thus improving the hold of individual optical fibers 205 in molded transition piece 206. In some implementations, the cavity in molded transition piece 206 may be filled with epoxy such that a small portion of the epoxy escapes through hole 213, thus providing a visual indicator to the installer that the cavity has been completely filled with epoxy. This prevents multi-fiber cable 202 from backing out of epoxy transition 203. Boot 207 also provides bend radius control of multi-fiber cable 202.

Single fiber optic connectors 216 may be terminated onto individual optical fibers 205 and assembled epoxy transition 203 may be attached to fiber optic module 201. As shown in FIGS. 8 and 9, epoxy transition 203 may include a single flange 212 that slides in slot 217 in the back of fiber optic module 201. Once epoxy transition 203 has been installed, individual optical fibers 205 may be routed inside fiber optic module 201 in a circular fashion (as shown in FIG. 8) to maintain a minimum acceptable bend radius. Single fiber optic connectors 216 may be inserted into fiber optic adapters 204 at the front of fiber optic module 201.

Note that while the present disclosure includes several embodiments, these embodiments are non-limiting, and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the embodiments of the present disclosure. It is therefore intended that claims that may follow be interpreted as including all such alterations, permutations, and equivalents as fall within the true spirit and scope of the present disclosure.

The invention claimed is:

1. A fiber optic module system, comprising:
    a fiber optic module holding a plurality of optical adapters at a front of the fiber optic module;
    a multi-fiber cable comprising a plurality of individual optical fibers; and
    an epoxy transition comprising a first opening at a first end and a cone-shaped component including a second opening at a second end, wherein the first opening is configured to receive the multi-fiber cable and the second opening is configured to output the plurality of individual optical fibers, wherein the epoxy transition is filled, at least in part, with an epoxy to secure the plurality of individual optical fibers as the multi-fiber cable transitions to the plurality of individual optical fibers within the epoxy transition.

2. The fiber optic module system of claim 1, wherein the cone-shaped component is included as part of an epoxy transition piece, and the epoxy transition further comprises a boot.

3. The fiber optic module system of claim 2, wherein the epoxy transition piece is filled with the epoxy through a fill hole on the epoxy transition piece.

4. The fiber optic module system of claim 3, wherein the epoxy transition piece is filled with the epoxy such that a portion of the epoxy exits the second opening included in the cone-shaped component.

5. The fiber optic module system of claim 2, wherein the boot includes a cable size identifier.

6. The fiber optic module system of claim 5, wherein the cable size identifier denotes the fiber count that the boot is designed to be used with.

7. The fiber optic module system of claim 6, wherein the cable size identifier is twelve.

8. The fiber optic module system of claim 6, wherein the cable size identifier is twenty-four.

9. The fiber optic module system of claim 1, wherein at least one individual optical fiber of the plurality of individual optical fibers is connected at a free end to a single fiber optical connector.

10. The method of claim 1, wherein the multi-fiber cable is sheathed with a sheathing material outside the epoxy transition; and wherein the sheathing material is removed for the plurality of individual optical fibers within the epoxy transition.

\* \* \* \* \*

UNITED STATES PATENT AND TRADEMARK OFFICE
CERTIFICATE OF CORRECTION

PATENT NO. : 10,656,360 B2  
APPLICATION NO. : 16/245441  
DATED : May 19, 2020  
INVENTOR(S) : Thomas M. Sedor et al.

Page 1 of 1

It is certified that error appears in the above-identified patent and that said Letters Patent is hereby corrected as shown below:

In the Claims

Column 5, Line 14 which reads "10. The method of claim 1, wherein the multi-fiber cable . . ." should read "10. The fiber optic module system of claim 1, wherein the multi-fiber cable . . ."

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*